Dec. 4, 1962 J. A. STEIN 3,066,527
AIR FILTER GAUGE
Filed Nov. 20, 1959
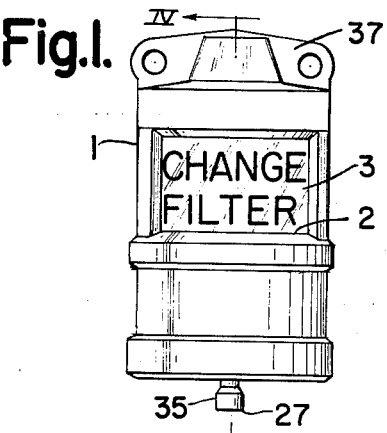
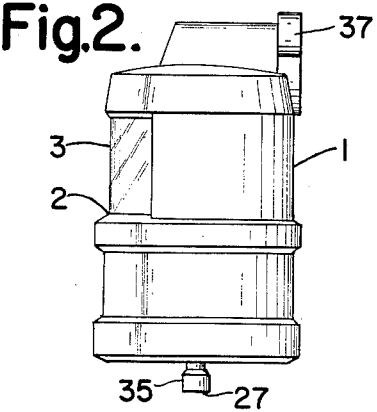
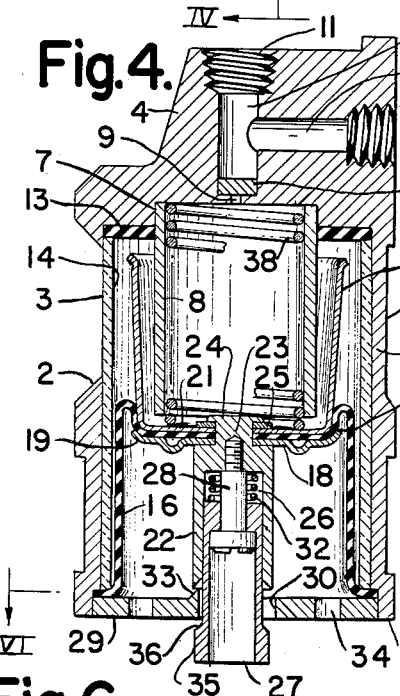
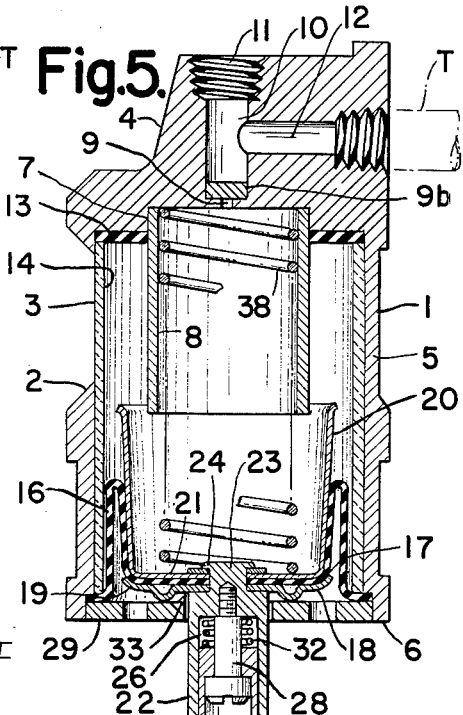
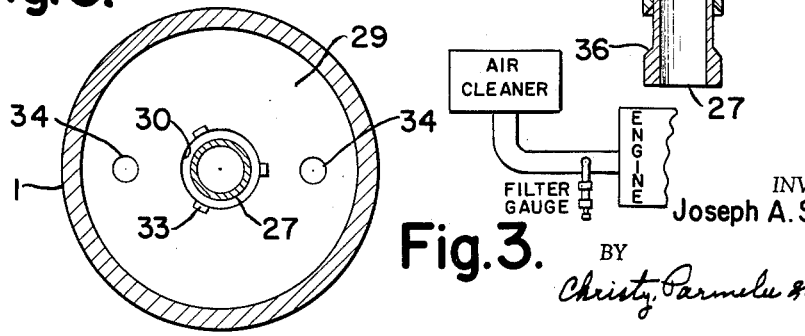
INVENTOR.
Joseph A. Stein
BY
Christy, Parmelee & Strickland
ATTORNEYS.

United States Patent Office 3,066,527
Patented Dec. 4, 1962

3,066,527
AIR FILTER GAUGE
Joseph A. Stein, Pittsburgh, Pa., assignor to Bacharach Industrial Instrument Company, Pittsburgh, Pa., a corporation of Pennsylvania
Filed Nov. 20, 1959, Ser. No. 854,294
7 Claims. (Cl. 73—118)

The present invention relates to air filters such as are used to extract dirt and other solid matters from air passing through the filter and is specifically concerned with a gauge connected with the outlet side of the filter and actuated by suction pressure to visually indicate the need for cleaning or replacement of the filter when so clogged with solid matters as to be unable to deliver a sufficient volume of air to a device being protected by the filter.

Internal combustion engines are equipped with air filters for removing suspended solid matter from air delivered to the engine cylinders. Heretofore such filters included a mass of oil impregnated metal fibers and were kept clean by periodic servicing, which in the case of a road vehicle was performed usually after every so many thousand miles of road travel. At the present time, the use of so-called dry filters of paper, which are more efficient and, therefore, subject to more rapid clogging, are rapidly displacing the former oil-metal filters and the dry filters must be tested to determine their efficiency and need for cleaning or replacement.

The object of the present invention is to provide a simple gauge which registers the need for filter cleaning or replacement by giving a visual signal, such as "Change Filter" or a solid colored, such as red, signal which is fully exposed when the filter needs servicing, and which gauge may be readily reset to not display such signal after the filter has been cleaned or replaced. Said gauge is actuated to display said signal upon a preselected reduction in the air volume passed by the filter during operation of the engine, as indicated by increased suction pressure in the air supply line to the engine cylinders.

This and other objects will be made apparent from the following description and the drawing forming a part thereof, wherein:

FIG. 1 shows a front elevation of the gauge displaying the signal "Change Filter";

FIG. 2 shows a side elevation of the gauge;

FIG. 3 shows one method of mounting the gauge upon a diesel engine;

FIG. 4 shows a section through the gauge on lines IV—IV of FIG. 1;

FIG. 5 shows a section through the gauge on lines similar to FIG. 4, but with the gauge reset after filter servicing or replacement; and FIG. 6 shows a section on line VI—VI of FIG. 4.

Referring now to FIGS. 1 and 4 of the drawings, the gauge comprises a housing 1 having a window opening 2 in one face thereof and a hollow cylindrical liner 3 within said housing having a transparent portion closing said window opening 2. An alternate, but least preferred form of construction, permits dispensing with the liner and closing the housing window opening by any suitable transparent means. The housing may be of any suitable shape and is shown in the drawing as being of generally cylindrical shape having an internal cylindrical cavity 5, closed at one end by head portion 4 and provided with an open bottom portion 6. The head portion at the axial line of the cavity is counterbored as at 7 to receive a rigid hollow cylindrical member 8 which is press-fitted into the counterbore 7. Above member 8 is a small passageway 9 which connects the internal cavity 5 to passageway 10, having at the lower end thereof a filter element 9b. The passageway 10 extending downwardly from the top face of head portion 4 connects with passageway 9 and a horizontal passageway 12. The outer end of passageway 12 is tapped to receive a screw fitting for attachment of a suction tube T to housing 1. The outer end of passageway 10 is tapped for a suitable screw fitting to form an alternate attachment of tube T, but is shown as closed by a suitable plug 11.

The inner end of housing cavity 5 has a suitable air impervious gasket 13 surrounding cylindrical member 8 and abutting the adjacent housing head portion. Within cavity 5 is a closely fitting hollow cylindrical liner 14 abutting the gasket 13 and terminating short of the bottom of the cavity. Within the liner 14 is an inverted cup-shaped flexible rubber diaphragm 16 having cylindrical side walls engaging the adjacent liner walls and closed at one end by the transverse wall 17. Upon the inner face of the transverse diaphragm wall 17 is disposed a circular retainer plate 18 having a slightly upwardly deflected peripheral flange 19. Upon the outer face of the diaphragm transverse wall 17 is an upwardly extending hollow cup-shaped member having side walls 20 enclosing the member 8 in spaced relation thereto and a transverse bottom wall 21 having one face adapted to abut member 8 and the opposite face engaging the transverse wall 17 of the diaphragm. The cup-shaped rigid member, diaphragm and retainer plate have registering apertures and are connected by a guide rod 22 having a reduced end portion 23 extending through said registering apertures. The guide rod is secured in place by any suitable means, such as having portion 23 riveted over as at 24 upon a washer member 25. Within the member 8 is a helical compression spring 38 having its respective opposite ends engaging the inner face of counterbore 7 and the cup transverse wall 21. The spring is preferably under some compression even when extended as in FIG. 5.

The guide rod 22 has a hollow depending portion 26 and has movably mounted in portion 26 a reset button 27 which is retained in place by the pin 28. Said reset button depends from said guide rod through the open end of said housing cavity 5. The open end of said housing cavity 5 is closed by a bottom plate 29, having a central aperture 30 therein through which the reset button 27 depends below the housing plate 29. The bottom plate may be secured in place by any suitable means. As shown in FIG. 4 the open end of the housing cavity 5 is slightly counterbored as at 31 and plate 29 is press-fitted therein with the adjacent ends of the side walls of diaphragm 16 extending between the lower end of liner 14 and the adjacent plate 29. As shown in FIG. 4, the cap 29 has a central aperture 30 therein. At spaced intervals on the inner face of plate 29, are nibs 33 extending upwardly about the periphery of the aperture 30. Intermediate the plate aperture 30 and the periphery of the plate 29 are one or more smaller apertures 34 through the plate for ingress and egress of air from the diaphragm. The reset button depending below plate 29 has an enlarged end portion 35, the inner faces 36 of which are tapered so as to be centered within plate aperture 30 when pushed upwardly. As shown in FIG. 4, the reset button 27 depending from guide rod 22 upon pin 28, has the inner end of the reset button in spaced relation to the inner end of cavity 26 in the guide rod permitting relative movement between the two members. Helical spring 32 is used to bias reset button against the head of pin 28. As part of housing 1 are two flanged portions 37 with openings therein for attaching the gauge upon the said engine or any other suitable support.

Referring now to the operation of the gauge, head opening 12 has one end of a suction tube T mounted therein with the opposite end of tube T communicating with an air inlet connection located between the air filter and engine cylinders. The remaining opening is closed by a suitable plug 11. The normal position of reset button 27, diaphragm 16 and cup 20 assembly when the filter is supplying sufficient air to the carburetor is as shown in FIG. 5 with the guide rod depending through cap opening and diaphram 16 collapsed sufficient to carry cup 20 and its legend "Change Filter" below the housing window opening 2. In this position the bottom wall 21 of the cup is disposed in spaced relation to the bottom of cylindrical member 8. The coiled compression spring 38 is then under a compressive force greater than atmospheric pressure to retain the diaphragm in collapsed position against atmospheric pressure of the air entering through apertures 34 in housing bottom cap 29. Under these conditions the cup 20 will remain in the position shown in FIG. 5 with its legend "Change Filter" concealed when the engine is not running or when the filter is freely passing air to the cylinders.

As the said filter becomes clogged with solid matter removed from the air passing therethrough, the engine cylinders in withdrawing the air from the intake manifold create an increasing suction force and such suction force is transmitted through connecting suction tube T to passageway 12 into the interior of housing cavity 5 above the diaphragm transverse wall 17. Such suction force above the diaphragm, plus the atmospheric pressure beneath the diaphragm slowly compresses spring 38 raising cup 20 until the cup engages the lower end of member 8, as shown in FIG. 4, and in such position fully exposes the legend "Change Filter" through the window opening 2 of the gauge housing, see FIG. 1. When such suction is once sufficient to engage cup wall 21 with member 8, the guide rod 22 is wholly withdrawn through aperture 30 of housing bottom plate 29 and, becoming slightly displaced laterally, is prevented from reentering plate aperture 30 by nibs 33 when said suction is reduced, as when the engine is idling or stopped. Normally, the uneven upward movement of diaphragm 16 will laterally displace guide rod 22 to engage bottom cap nibs 33 but to insure such displacement the bottom edge of member 8 may be sloped to one side thereof.

After the filter element has been cleaned or replaced, the gauge may be reset by first pressing upwardly upon reset button 27, compressing spring 32, until the tapered edge 36 of reset button 27 engages the mating taper at the lower end of guide rod 22, thereafter lifting reset button 27 and guide rod 22 together until edge 35 of reset button 27 enters central aperture 30. This will center reset button 27 in aperture 30, and also the guide rod 22. When such alignment takes place, spring 38 automatically forces cup 20 and diaphragm downwardly carrying guide rod 22 into cap aperture 30, into the reset position shown in FIG. 5, and the legend "Change Filter" is again concealed within the housing below housing window 2.

The spring 38 serves a useful purpose in that it is compressed by upward movement of the diaphragm and such energy is useful in returning the guide rod into the cap aperture upon actuation of the reset button as described. In the absence of such a spring the diaphragm would tend to have a "snap" action whenever a sub-atmospheric pressure was developed above the diaphragm. The use of the spring, with its increasing resistance as compression proceeds, provides for gradual increasing exposure of the visual "Change Filter" signal as the efficiency of the filter decreases during operation of the engine. In addition, by substituting springs of different strength, various calibrations can be obtained.

The purpose of filter element 9b is first to prevent damage to the engine in the event of gauge damage, such as glass window breakage. In this event, the filter will keep broken glass particles or other air borne foreign material from entering engine cylinders. A second purpose is to provide a restriction or throttling effect to dampen out intake manifold suction-pressure fluctuations which might otherwise cause undesirable oscillations of cup 20.

The purpose of openings 11 and 12 in the head of housing 1 is to permit alternate attachment of suction tube T thereto. Obviously, one such opening may be omitted if desired. The exact details of construction shown and described, are for purposes of illustration and not limitation except as made necessary by the scope of the appended claims.

I claim:
1. A gauge for registering increasing suction in an air intake manifold, comprising an elongated housing having a closed head portion, an elongated cavity extending inwardly from the opposite end of the housing, a transparent window opening in the housing cavity adjacent said head portion, a closure plate for the said opposite end of said cavity, a spring loaded connected cup and collapsible flexible diaphragm mounted in said cavity for movement towards and away from said closure plate, apertures in said closure plate exposing said diaphragm to atmospheric pressure an opening in said head portion communicating with said cavity for establishing a connection between said head opening and the interior of an associated air intake manifold whereby suction in the manifold and atmospheric pressures acts on said cup and diaphragm for moving same relative to said closure plate against said spring pressure, a signal integral with said cup for display through said housing window when the diaphragm is extended a maximum distance by manifold suction and for concealment below said window when the diaphragm is collapsed by spring pressure upon reduction of manifold suction, a central aperture in said closure plate, a guide rod secured to said diaphragm so as to depend through said central aperture when the diaphragm is collapsed and to be retracted through the aperture and within the housing when the diaphragm is extended to display the said signal through said window, and means within said housing normally preventing the guide rod from re-entering said closure plate central aperture upon reduction of said manifold suction after display of the signal whereby the signal is continuously displayed through said housing window opening.

2. The gauge as defined in claim 1 wherein means within said housing causes said guide rod to be laterally displaced upon retraction through said closure plate central aperture and means on said closure plate for engagement with said displaced guide rod to retain the diaphragm in extended position upon reduction in said manifold suction.

3. The gauge as defined in claim 1 wherein a reset button is mounted on said guide rod for limited axial movement relative thereto and depends therefrom through said closure plate central aperture, an enlarged head on said reset button depending below said closure plate, tapered faces on said button head for centering said reset button within said closure plate central aperture and for centering said guide rod relative to said aperture for re-entry under pressure from said sping in collapsing the diaphragm when released from manifold suction.

4. The gauge as defined in claim 1 wherein the diaphragm is an inverted hollow cup-shaped member having a peripheral flange on the free ends of the cup-walls disposed between the closure plate and the housing, the bottom portion of the cup-shaped diaphragm being collapsed downwardly within the housing side walls.

5. A gauge for registering increasing suction in an air intake manifold, in combination, a housing having a closed end head portion and a cavity extending inwardly from the opposite end of the housing to adjacent the head portion, an inlet aperture in said housing head portion communicating with said housing cavity, a hollow cylindrical liner in said cavity extending from said head portion to adjacent the opposite end of the casing, a hollow cylindrical flexible diaphragm member disposed within said liner and having a transverse top portion joined to said cylindrical walls by re-entrant flanges permitting inward collapsing movement of said diaphragm top-portion towards the open end of the housing, a peripheral flange on the open end of the diaphragm disposed beneath the adjacent end of the liner, an apertured closure plate for said housing cavity retaining the diaphragm peripheral flange beneath said liner and exposing the diaphragm top portion to atmospheric pressure, a cup-shaped rigid member having its bottom portion secured to said diaphragm top portion, a helical compression spring having one end mounted within said cup upon the cup bottom portion and the opposite spring end engaging the upper end of said housing cavity, said spring normally retaining the said diaphragm in collapsed position against atmospheric pressure, an enlarged central aperture in said closure plate, a hollow cylindrical guide rod secured to said diaphagm top portion and depending therefrom in spaced relation to the closure plate aperture when the said diaphragm is in extended position and depending through said diaphragm top portion and depending therefrom in normal collapsed position, a reset button mounted within said guide rod for longitudinal movement relative thereto and depending therefrom through said closure plate aperture, an enlarged head on the reset button disposed outwardly of said closure plate, inclined faces on said head for registering with said corresponding closure plate central aperture walls for centering the guide rod relative to said plate cental aperture when the button is moved upwardly relative to the guide rod, means on the inner face of said closure plate for engaging with said guide rod normally preventing re-entrance of the guide rod through said plate aperture after retraction by extension of the diaphragm, a window in said housing and a visual signal on said cup-shaped member positioned to be visible through said window only when the diaphragm is evtended to withdraw said guide rod wholly through said closure plate aperture.

6. The gauge as defined in claim 5 wherein a hollow cylindrical guide member encloses a portion of said spring and extends within said cup when the diaphragm is in extended position.

7. A resettable gauge for visually registering suction in an engine intake manifold indicating the degree of resistance to passage of air through a standard air intake filter due to dirt therein, comprising a hollow housing member, a fixed head portion closing one end of the housing member, an apertured closure plate for the opposite end of the housing member, exposing the housing to atmospheric pressure, a spring-loaded signal member movably mounted within said housing between said head portion and closure plate, said spring resisting atmospheric pressure against said signal, an opening through the upper part of said housing for exposing said signal when the filter needs servicing, an opening through said head portion communicating with the interior of said housing, a tube connecting said head opening with the interior of an engine air intake manifold and exposing said signal member to manifold suction to lift said housing signal member against said spring, a reset member depending from said signal member and normally depending through a central aperture in said closure plate opening when the filter is not in need of servicing, said housing closure plate and reset member having means thereon for engagement when the signal member is fully retracted against said spring pressure by suction in said air intake manifold for continuously exposing said signal through said housing opening regardless of whether the engine is running.

References Cited in the file of this patent

UNITED STATES PATENTS

| | | |
|---|---|---|
| 2,843,077 | Leefer | July 15, 1958 |
| 2,850,900 | Billington | Sept. 9, 1958 |
| 2,911,606 | Hoffman | Nov. 3, 1959 |
| 2,936,731 | Rosaen | May 17, 1960 |
| 2,948,151 | Astl | Aug. 9, 1960 |

UNITED STATES PATENT OFFICE
CERTIFICATE OF CORRECTION

Patent No. 3,066,527                      December 4, 1962

Joseph A. Stein

It is hereby certified that error appears in the above numbered patent requiring correction and that the said Letters Patent should read as corrected below.

Column 2, line 51, for "cap" read -- plate --; column 4, line 58, for "sping" read -- spring --; column 5, line 21, for "diaphragm top portion and depending therefrom" read -- plate central aperture when the diaphragm is --; lines 36 and 37, for "evtended" read -- extended --.

Signed and sealed this 14th day of May 1963.

(SEAL)
Attest:

ERNEST W. SWIDER
Attesting Officer

DAVID L. LADD
Commissioner of Patents